United States Patent
Ernst et al.

(10) Patent No.: US 6,489,048 B1
(45) Date of Patent: Dec. 3, 2002

(54) OPERATING A FUEL CELL SYSTEM DURING LOW POWER DEMAND

(75) Inventors: William D. Ernst, Troy, NY (US); Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/502,887

(22) Filed: Feb. 11, 2000

(51) Int. Cl.⁷ .................................................. H01M 8/04
(52) U.S. Cl. ........................................... 429/13; 429/22
(58) Field of Search ............................. 429/12, 13, 17, 429/22, 23, 26

(56) References Cited

U.S. PATENT DOCUMENTS 5,154,986 A * 10/1992 Takechi et al. ............... 429/23
5,678,647 A * 10/1997 Wolfe et al. ................ 180/65.3
5,714,276 A * 2/1998 Okamoto ....................... 429/17
6,120,923 A * 9/2000 Van Dine et al. .............. 429/17
6,242,119 B1 * 6/2001 Komura et al. ................ 429/17

* cited by examiner

Primary Examiner—Patrick Ryan
Assistant Examiner—M. Wills
(74) Attorney, Agent, or Firm—Trop, Pruner & Hu, P.C.

(57) ABSTRACT

A fuel cell system includes a fuel cell stack, a fuel processor, a heater and a controller. The fuel cell stack provides an output power that includes a first power that is consumed by a first load. The fuel processor furnishes a fuel flow to the fuel cell stack, and the heater furnishes heat to the fuel processor when enabled. The controller is coupled to the fuel cell stack to monitor the output power and is coupled to the heater to selectively enable the heater to provide heat to the fuel processor when the first power decreases below a predetermined threshold.

21 Claims, 4 Drawing Sheets

OPERATING A FUEL CELL SYSTEM DURING LOW POWER DEMAND

BACKGROUND

The invention relates to operating a fuel cell system during low power demand.

A fuel cell is an electrochemical device that converts chemical energy that is produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

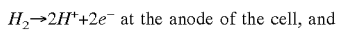

$H_2 \rightarrow 2H^+ + 2e^-$ at the anode of the cell, and

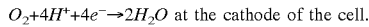

$O_2 + 4H^+ + 4e^- \rightarrow 2H_2O$ at the cathode of the cell.

Because a single fuel cell typically produces a relatively small voltage (around 1 volt, for example), several fuel cells may be formed out of a stack of fuel cells in series to produce a higher voltage. The fuel cells may include plates (graphite composite or metal plates, as examples) that are stacked one on top of the other, and each plate may be associated with more than one fuel cell of the stack. The plates may include various channels and orifices to, as examples, route the reactants and products through the fuel cell stack. PEMs (each one being associated with a particular fuel cell) may be located throughout the stack between the anodes and cathodes of the different fuel cells.

As an example, a residential fuel cell system may include a fuel processor to convert a hydrocarbon (a natural gas or propane, as examples) into a hydrogen-rich reformat that is consumed by the fuel cell stack pursuant to the above-described reactions. As an example, the fuel system may be used to deliver power to a house, a load that typically varies over the course of each day. In this manner, during the early morning hours, the house typically demands far less power than the house requires during other parts of the day. This variance may affect operation of the fuel processor. As an example, the efficiency of the fuel processor may be optimized to perform over a predefined power range, such as a reformat output sufficient to correspond to a system power output in the range from 2 kilowatts (kW) to 7 kW. When the power demand drops below the 2 kW level, the fuel processor may have difficulty in maintaining a desired quality of the reformat, or the efficiency of the fuel processor may decline.

Thus, there is a continuing need for an arrangement that addresses one or more of the problems that are stated above.

SUMMARY

In an embodiment of the invention, a fuel cell system includes a fuel cell stack, a fuel processor, a heater and a controller. The fuel cell stack provides an output power that includes a first power that is consumed by a first load. The fuel processor furnishes a fuel flow to the fuel cell stack, and the heater furnishes heat to the fuel processor when enabled. The controller is coupled to the fuel cell stack to monitor the output power and is coupled to the heater to selectively enable the heater to provide heat to the fuel processor when the first power decreases below a predetermined threshold.

Advantages and other features of the invention will become apparent from the following description, from the drawings and from the claims.

DETAILED DESCRIPTION

Figure 1:
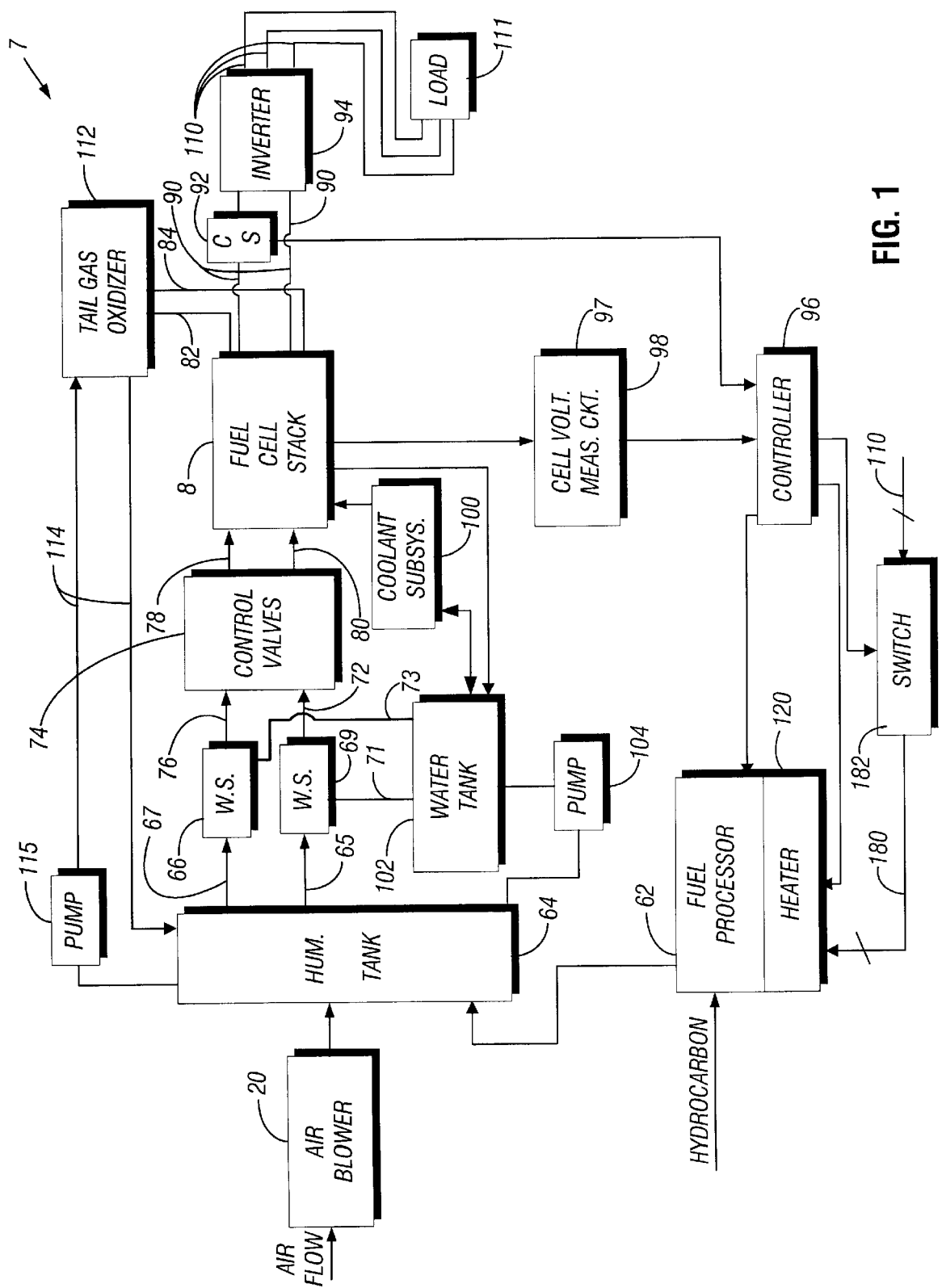
FIGS. 1, 2 and 3 are schematic diagrams of fuel cell systems according to different embodiments of the invention.

Referring to FIG. 1, an embodiment 7 of a fuel cell system in accordance with the invention includes features that enhance performance of the system 7 during times when the power that is demanded by a load 111 (to the system 7) is relatively low. For example, the load 111 may be a composite of several residential loads that are located in a house. During most of the day, the load 111 may demand a power between 2 kilowatts (kW) and 7 kW. However, during some times of the day, such as the early morning hours (as an example), the power that is demanded by the load 111 may decrease below 2 kW. During low power demand, a fuel processor 62 (of the system 7) may not be capable of producing reformat (that is consumed by a fuel cell stack 8 of the system 7) efficiently or of a high enough quality if not for the features of the system 7 that are described below.

Reformat quality parameters may vary and may be arbitrarily selected. In a fuel cell system with a natural gas fuel processor, adequate reformat quality might refer to an unreacted natural gas concentration (methane slip, or more generally fuel slip) in the processed fuel stream of less than 3% or 1.5% as examples. Another exemplary threshold for reformat quality might be a processed fuel stream containing more than 30% hydrogen. Other reformat quality parameters may also be selected. In general, as the reformer temperature is increased, the fuel slip will decrease, approaching a lower limit such as zero fuel slip. In one sense, the efficiency of a reformer might be defined according to fuel slip. For example, it might be unacceptable from an efficiency standpoint to allow more than 5–10% of a fuel to go unreacted in the reformer.

With respect to the hydrogen produced by the reformer, there may be an optimum temperature for maximized hydrogen production. In some cases, it may be desirable to raise a reformer temperature above the optimum hydrogen production point to decrease fuel slip to a satisfactory level. The temperatures corresponding to these operating points may depend on the type of catalyst used for the reforming reaction. Various reforming catalysts and reaction processes are well known in the art, and this invention is not limited to the particular catalyst or reforming method that is used. For example, reforming methods that can be improved with the present invention could include as examples, catalytic partial oxidation, steam reforming, and autothermal reforming.

As an example of a particular catalyst and lower acceptable temperature threshold that can be used, an autothermal natural gas reformer might use Engelhard's ATR catalyst, and it may be desired to keep the catalyst at a temperature of over 850° F. for methane reforming. At the time of this disclosure, beyond the well known thermodynamic theories previously discussed, the precise numerical relationships between temperature and fuel slip and hydrogen production remains unknown as the proprietary information of various catalyst and fuel processor vendors. However, for purposes of the present invention, for methane reforming, 850° F. is taken as the lower reformer temperature threshold, regardless of the type of catalyst or reforming method used. The invention also applies to reforming of other fuels, including but not limited to propane, methanol and gasoline as examples.

In particular, in some embodiments of the invention, the system 7 includes a heater 120 that furnishes additional heat to the fuel processor 62 when the power that is demanded by the load 111 decreases below a minimum power operating point of the fuel processor 62. Below this minimum power operating point, the fuel processor 62 may not be capable of producing quality reformat. However, with the additional heat that is furnished by the heater 120, the fuel processor 62 is capable of operating below the minimum power operating point. As an example, in some embodiments of the invention, the minimum power operating point may be near 2 kW, and the heater 120 may consume approximately 500 W of power to produce approximately 500 W of heat that is used to sustain catalytic reactions of the fuel processor 62. It will be appreciated that the heater may be a variable power resistive heater with a variable heat output. For example, the controller 96 (of the fuel cell system 7) may select the power sent to the heater 120 (up to 500 W for example) according to the needs of the fuel processor (methane reformer reaction temperature below 850° F., for example).

Figure 1A:
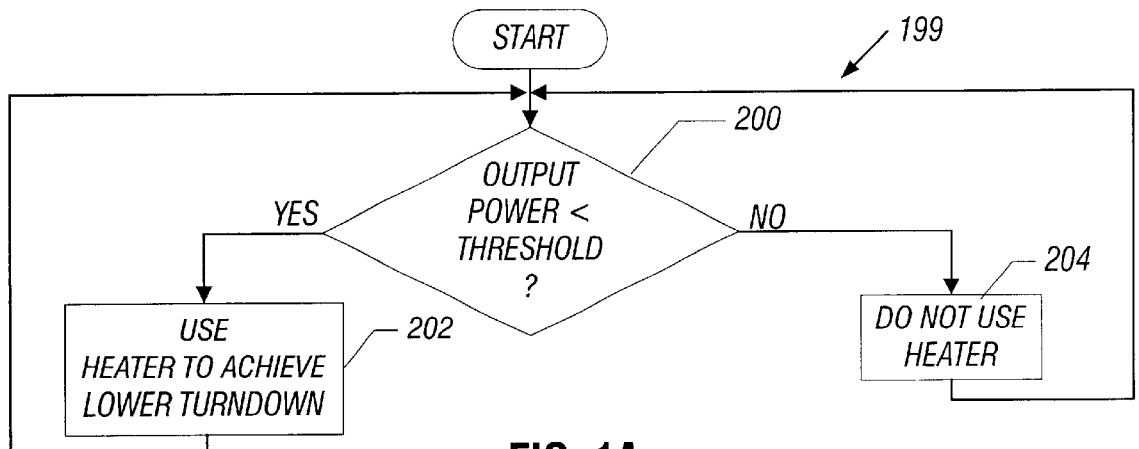
FIG. 1A is a flow diagram illustrating a control scheme to enhance performance of a fuel processor of the system during a low power demand.
Figure 1B:
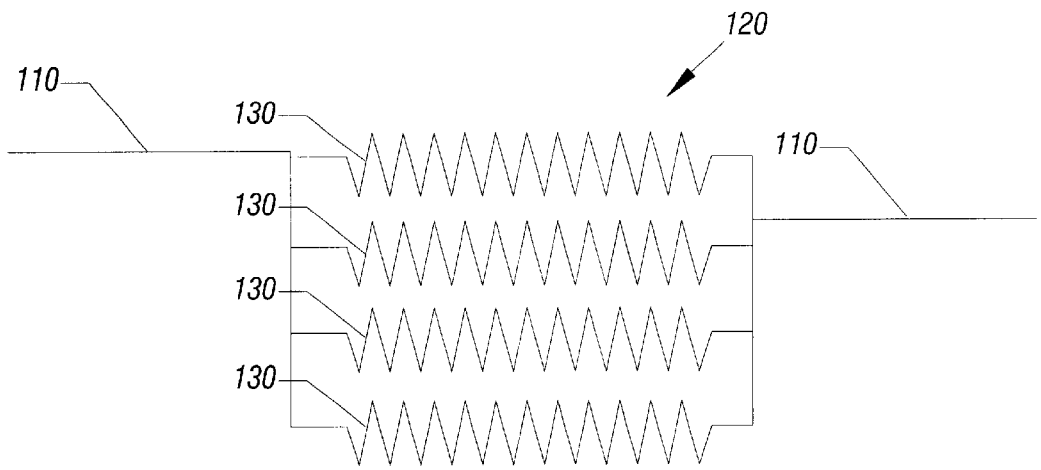
FIG. 1B is a schematic diagram of a heater for the fuel processor according to an embodiment of the invention.

In some embodiments of the invention, a controller 96 may operate a switch 182 to selectively electrically couple output terminals 110 of the fuel cell system 7 to the heater 120. In this manner, referring also to FIG. 1A, the controller 96 may use a technique 199 that includes periodically determining (diamond 200) if the output power of the fuel cell system 7 is below a predetermined minimum power threshold that defines the minimum power operating point. If so, the controller 96 closes the switch 182 (if not already closed) so that the heater 120 is used, as depicted in block 202. However, if the controller 96 determines that the output power of the fuel cell system 7 is above the predetermined minimum power threshold, then the controller 96 opens the switch 182 (if not already opened) so that the heater 180 is not used, as depicted in block 202. As an example, in some embodiments, the switch 182 may be a relay (as an example), and the heater 120 may be formed from coiled heating elements 130 that are depicted in FIG. 1B. As shown, the heating elements 130 may be coupled together in parallel.

The present invention is not limited by the specific way the heater 120 is coupled to the fuel processor 62 to provide heat for a higher reforming reaction temperature. For example, the heater 120 could be placed around the outside of a reformer reactor vessel (not shown). The reactor vessel might be made from metal or another heat conductive material. The catalyst inside the reactor vessel could be placed in a heat conducting relationship with the outside wall of the reactor vessel being heated by heater 120. Heater 120 could also be located inside the reactor vessel to contact the catalyst directly. Other arrangements are possible.

Heater 120 could also be used to generate steam for the reforming reaction. For example, the typical fuel processor may include a steam generation system (not shown) that uses heat from a catalytic partial oxidation reaction to heat water into steam. Multiple steam generating heat exchangers may also be placed at locations throughout a fuel processing system to utilize reaction heat to generate steam. However, it will be appreciated that such systems would serve to remove heat from the fuel processor, and would thus tend to lower the reforming reaction temperature, perhaps to unacceptably low temperatures at low fuel processor production rates corresponding to low power demand (high turn down). The present invention provides a means to maintain adequately high reaction temperatures at a wider range of operating conditions.

Among the other components of the fuel cell system 7, the system 7 may include a humidification tank 64 that receives a fuel flow from the fuel processor 62 and receives an air flow from an air blower 20. The air flow provides oxygen (a reactant), and the fuel flow provides hydrogen (another reactant) for consumption by a fuel cell stack 8 of the system 7.

The humidification tank 64 produces steam by circulating water through a heat source, such as a tail gas oxidizer 112, via water and steam lines 114. In this manner, a pump 115 of the system 7 may be used to circulate the water. The air and fuel flows are combined with the steam inside the tank 64 to produce humidified air and fuel flows that exit the humidification tank 64 via outlet conduits 67 and 65, respectively. The fuel cell system 7 may include water separators 66 and 69 that are coupled to the conduits 67 and 65, respectively, to remove any excess water from the humidified air and fuel flows.

The outlet ports of the water separators 66 and 67 are coupled to conduits 76 and 72, respectively, that extend to control valves 74 that regulate the air and fuel flows and provide the regulated flows (via conduits 78 and 80) to the fuel cell stack 8.

The fuel cell stack 8, in turn, includes output terminals 90 that furnish a DC voltage that an inverter 94 uses to produce AC voltages on the output terminals 110 of the fuel cell system 7. The load 111 is described above as a residential load. However, other loads are possible, such as a load that is associated with an automobile, for example.

In some embodiments, the controller 96 may sense the power that is demanded by the load 111 by sensing the output power from the fuel cell stack 8. To accomplish this, a current sensor 92 may be coupled in-line with one of the output terminals 90 of the fuel cell stack 8 to provide an indication of the output current of the fuel cell stack 8 to the controller 96. The controller 96 may also receive indications of the cell voltages of the fuel cell stack 8 via a cell voltage measuring circuit 97. Based on these parameters, the controller 96 may determine the output power of the fuel cell stack 8 and thus, may determine the power that is demanded by the load 111. Based on the determined output power, the controller 96 controls operation of the switch 182 and interacts with the fuel processor 62 to control the fuel flow into the fuel cell stack 8. The tail gas oxidizer 112 receives the exhaust air and fuel flows via outlet conduits 82 and 84, respectively, and oxidizes any remaining gases in these flows.

Among the other features of the fuel cell system 7, the system 7 may include a coolant subsystem 100 that circulates a coolant through the fuel cell stack 8, such as de-ionized water, for example. In this manner, the coolant subsystem 100 may circulate de-ionized water between a water tank 102 and the fuel cell stack 8 also include a pump 104 that pumps de-ionized water, as needed, into the humidification tank 64. The water separators 66 and 69 include outlet ports that are connected to water lines to carry water from the water separators 66 and 69, respectively to the water tank 102.

Figure 2:
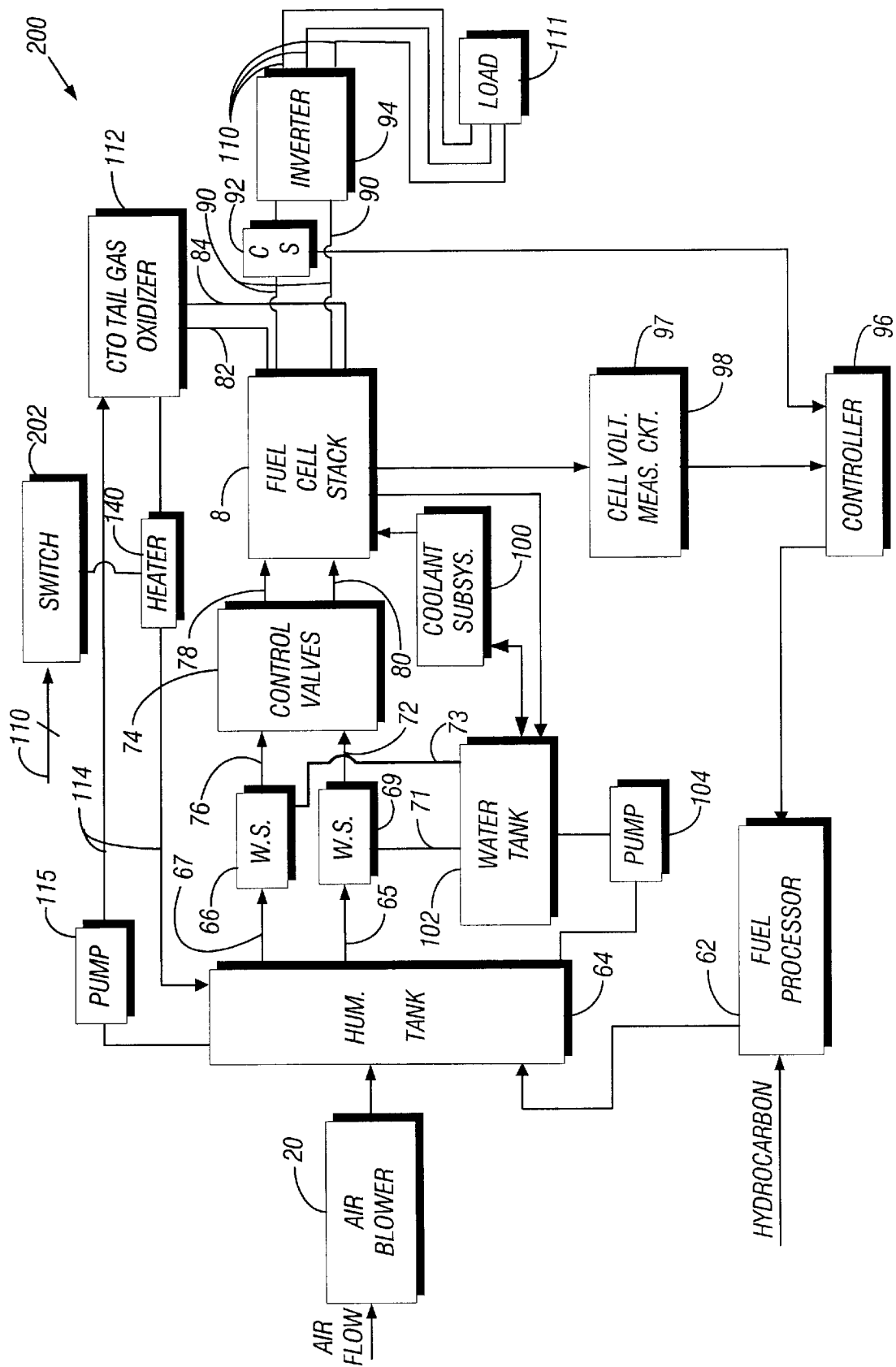

Besides using energy during times of lower power demand to increase the turn down performance of the fuel processor 62, in some embodiments of the invention, an additional load may also be created to enhance the overall performance of the system 7. For example, referring to FIG. 2, a fuel cell system 200 may be similar in design to the fuel cell system 7 except that the system 200 includes a heater 140 to, when connected to the output terminals 110 of the fuel cell stack 8, contribute thermal energy to the lines 114 that circulate water through the tail gas oxidizer 112 to generate steam. In this manner, during times of low power demand, the controller 96 may activate a switch 202 (a relay, for example) to couple the heater 140 to the output terminals 110 to turn the heater 140 on. The heater 140 both aids in the production of the steam for the humidifying of the air and fuel flows and adds an additional electrical load to the system 200 during times of low power demand to increase the load on the fuel processor 62.

Figure 3:
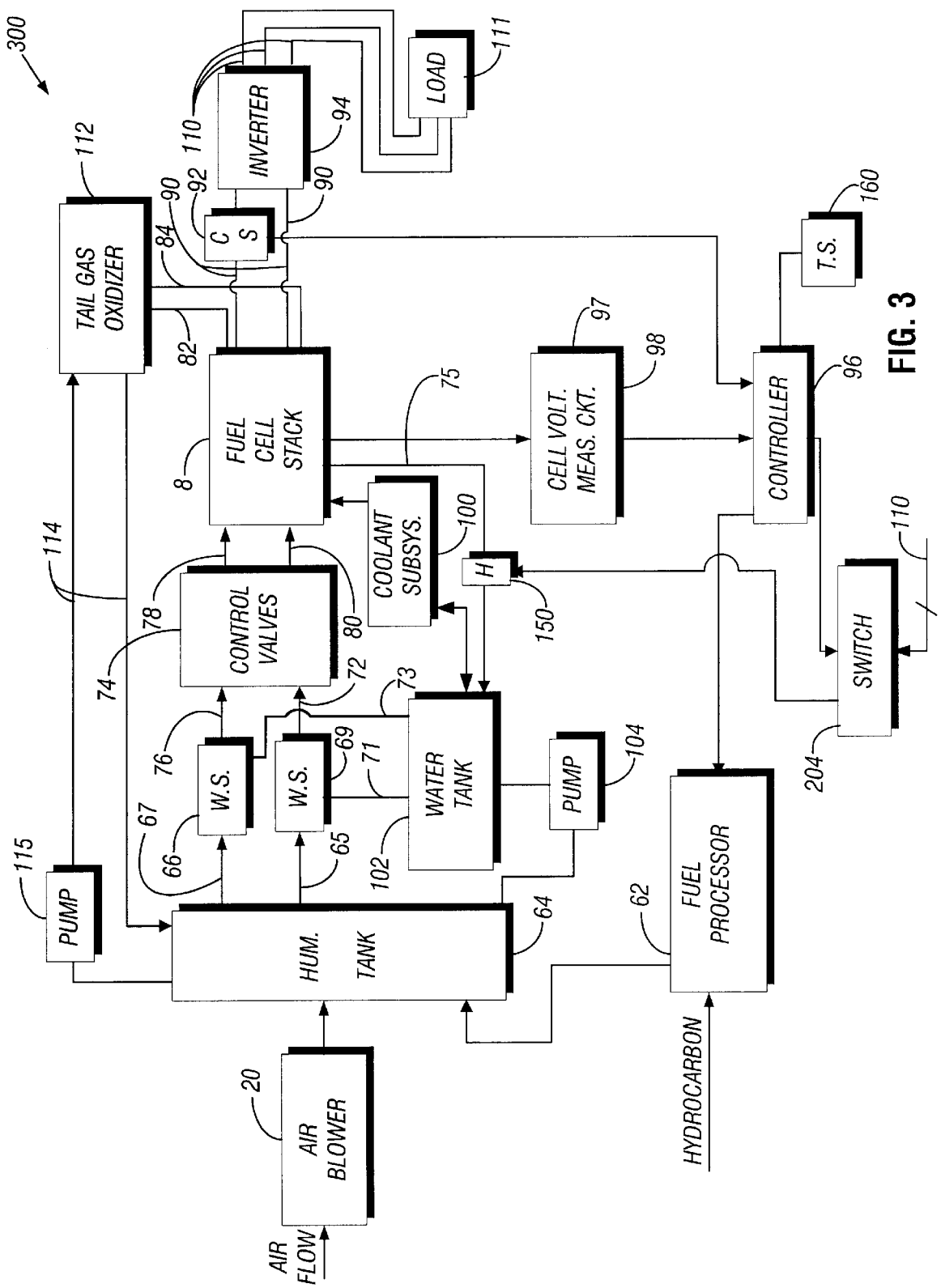

As another example, referring to FIG. 3, in some embodiments of the invention, a fuel cell system 300 that is similar in design to the fuel cell systems 7 and 200 may be used. Unlike the fuel cell systems 7 and 200, the fuel cell system 300 includes a heater 150 to, when connected to the output terminals 110 of the fuel cell stack 8, contribute thermal energy to the de-ionized water (of the water lines 175) that flows to the water tank 102. Because the fuel cell system 300 may be located in a climate that may have temperatures that are below the freezing point of the water, the additional thermal energy may keep water in the tank 102 from freezing. In this manner, the controller 96 may be coupled to a temperature sensor 160 to determine the ambient temperature. When the ambient temperature is below a predetermined threshold temperature and the power demand is below a minimum power threshold, the controller 96 may activate a switch 204 to couple the heater 150 to the output terminals 110 to turn the heater 150 on. The heater 150 both aids in the production of the steam for the humidifying of the air and fuel flows and adds an additional electrical load to the system 300 during times of low power demand to increase the load on the fuel processor 62.

Figure 4:
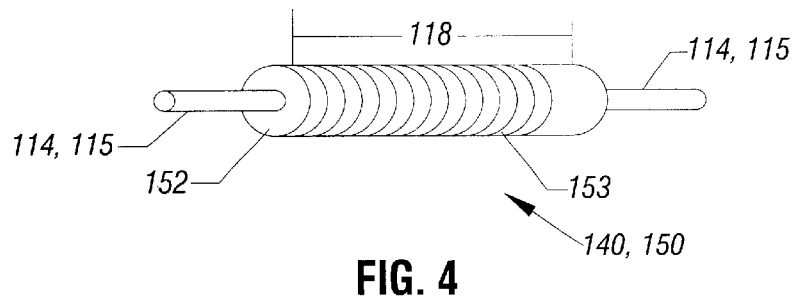
FIG. 4 is a schematic diagram of a heater for a water or coolant line according to an embodiment of the invention.

Referring to FIG. 4, as an example, in some embodiments, the heater 140, 150 may include a cylindrical support base 152 that includes a central passageway through which the steam/water line 114 or 175 extends. A wire resistive coil 153 is formed around the base 152 and includes terminals 118 that are electrically coupled to the output terminals via the switch 202 or 204.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
   a fuel cell stack including terminals to provide an output power;
   a subsystem electrical load;
   a switch; and
   a controller coupled to the fuel cell stack to monitor the output power and operate the switch to selectively couple the terminals to the load to increase the output power to enhance performance of a fuel processor in response to the output power decreasing below a predetermined power threshold.

2. The fuel cell system of claim 1, wherein the load furnishes heat when connected to the terminals, the system further comprising:
   a fuel processor to provide a fuel for the fuel cell stack and use at least some of the heat to maintain an operating point of the fuel processor above a turn down threshold.

3. The fuel cell system of claim 2, wherein the reformer is located near the electrical load to directly receive at least some of the heat from the electrical load.

4. The fuel cell system of claim 2, wherein the heat furnished by the electrical load is sufficient to maintain a reaction temperature of 850° F. for a natural gas reformer.

5. The fuel cell system of claim 2, wherein the heat furnished by the electrical load is sufficient to maintain a temperature of at least 800° F. for a natural gas reformer.

6. The fuel cell system of claim 1, wherein when the electrical load is connected to the terminals, the load furnishes heat to a steam generation subsystem to supply steam to the fuel processor.

7. The fuel cell system of claim 1, wherein s connected to the terminals, the load furnishes heat to a steam generation subsystem to supply steam to a fuel cell reactant stream.

8. The fuel cell system of claim 1, wherein the load furnishes heat when connected to the terminals, the system further comprising:
   a humidification subsystem to humidify a reactant flow that is used by the fuel cell stack and use at least some of the heat furnished by the load to produce steam.

9. The fuel cell system of claim 7 further comprising:
   a water line; and
   a humidification tank connected to the water line, wherein the electrical load furnishes at least some of the heat to water in the water line.

10. The fuel cell system of claim 1, wherein the load furnishes heat when connected to the terminals, the system further comprising:
    a coolant subsystem to circulate a coolant through the fuel cell system and use at least some of the heat furnished by the load to heat the coolant.

11. The fuel cell system of claim 9, further comprising:
    a coolant subsystem; and
    a coolant line to communicate coolant to the coolant subsystem,
    wherein the electrical load furnishes at least some of the heat to coolant in the coolant line.

12. The fuel cell system of claim 1, wherein the electrical load comprises a resistive load.

13. A method comprising:
    using a fuel cell stack to produce output power to a first electrical load that is capable of varying over time; and
    selectively coupling the fuel cell stack to a second electrical load to increase the output power to enhance performance of a fuel processor in response to the output power decreasing below a predetermined power threshold.

14. The method of claim 12, wherein the first electrical load comprises a residential electrical load.

15. The method of claim 12, wherein the second electrical load comprises a resistive load.

16. The method of claim 12, wherein the load furnishes heat when coupled to the fuel cell stack, the method further comprising:

using at least some of the heat to maintain an operating point of a fuel processor above a turn down threshold.

17. The method of claim 12, wherein the load furnishes heat when coupled to the fuel cell stack, the method further comprising:

using at least some of the heat furnished by the load to produce steam.

18. The method of claim 12, wherein the load furnishes heat when connected to the terminals, the method further comprising:

using at least some of the heat furnished by the load to heat a coolant.

19. A fuel cell system comprising:

a fuel cell stack to provide an output power that includes a first power consumed by a first load;

a fuel processor to furnish a fuel flow to the fuel cell stack;

a heater to furnish heat to the fuel processor when enabled; and a controller coupled to the fuel cell stack to monitor the output power and coupled to the heater to selectively enable the heater to provide heat to the reformer when the first power decreases below a predetermined threshold.

20. The fuel cell system of claim 18, wherein the first load comprises a residential load.

21. The fuel cell system of claim 18, wherein the heater comprises:

a resistive load; and a switch coupled between the resistive load and the fuel cell stack.

* * * * *

UNITED STATES PATENT AND TRADEMARK OFFICE
CERTIFICATE OF CORRECTION

PATENT NO.    : 6,489,048 B1
DATED         : December 3, 2002
INVENTOR(S)   : William D. Ernst and Michael M. Walsh It is certified that error appears in the above-identified patent and that said Letters Patent is hereby corrected as shown below:

Column 6,
Line 24, "s" should be -- when the electrical load is --;
Line 33, "7" should be -- 8 --;
Line 44, "9" should be -- 10 --;
Lines 61, 63 and 65, "12" should be -- 13 --.

Column 7,
Lines 3 and 8, "12" should be -- 13 --.

Column 8,
Lines 8 and 10, "18" should be -- 19 --.

Signed and Sealed this

Eighth Day of April, 2003

JAMES E. ROGAN
*Director of the United States Patent and Trademark Office*